United States Patent [19]

Erickson

[11] 4,283,374

[45] Aug. 11, 1981

[54] REGENERABLE MANGANESE OXIDE HOT GAS DESULFURIZATION PROCESS

[76] Inventor: Donald C. Erickson, 1704 S. Harbor La., Annapolis, Md. 21401

[21] Appl. No.: 123,376

[22] Filed: Feb. 21, 1980

[51] Int. Cl.$^3$ .................... C01B 17/16; C01B 31/20; B01J 8/00; C01B 17/00
[52] U.S. Cl. ................................. 423/230; 423/244; 423/539; 423/605
[58] Field of Search ............... 423/242 A, 242 R, 243, 423/244 A, 244 R, 49, 539, 605, 230

[56] References Cited

U.S. PATENT DOCUMENTS

| | | | |
|---|---|---|---|
| 2,984,545 | 5/1961 | Tarbutton et al. | 423/242 |
| 3,723,598 | 3/1975 | Spedden et al. | 423/244 |

OTHER PUBLICATIONS

Turkdoggan et al., Metallurgical Transactions B vol. 88, Mar. 1977 pp. 59-65.
Hemmings et al., Thermodynamic Phase Stability Diagrams for the Analysis of Corrosion Reactions in Coal Gasification Combustion Atmospheres, Dec. 1977.

Primary Examiner—O. R. Vertiz
Assistant Examiner—Gregory A. Heller

[57] ABSTRACT

A continuous regenerative process for desulfurizing a hot reducing gas is disclosed. The gas is scrubbed by a sorbent containing MnO and $Mn_3O_4$. The spent sorbent is regenerated by reacting the MnS with an excess of $Mn_3O_4$, contained in oxidized sorbent. The oxidized sorbent is obtained by reacting part of the regenerated sorbent with air. In the regenerator the gaseous oxygen partial pressure is maintained below $10^{-6}$ atmospheres which allows the $SO_2$ partial pressure to be maintained above 1 atmosphere without causing sulfation.

6 Claims, 2 Drawing Figures

REGENERABLE MANGANESE OXIDE HOT GAS DESULFURIZATION PROCESS

TECHNICAL FIELD

This invention relates to processes wherein hot reducing gas is scrubbed of sulfur species by a sorbent material, and then the sulfided sorbent is regenerated for reuse.

Reducing gas, also called low BTU gas, medium BTU gas, producer gas, fuel gas, synthesis gas, and other names is encountered widely in industry. It can be generated by partial oxidation of coal, oil, or other carbonaceous matter; it is used in furnaces, fired boilers, gas turbines, fuel cells, metallurgical reduction, synthesis of chemicals, and elsewhere. When it contains excessive sulfur species such as $H_2S$ and COS, it must be desulfurized for environmental, corrosion, and frequently also process considerations. High temperature desulfurization can be more efficient than low temperature desulfurization, since the reducing gas is normally both generated and consumed at high temperature.

BACKGROUND ART

Although the potential process efficiency advantages of hot gas desulfurization processes have long been recognized, none of the numerous processes investigated for this purpose has yet achieved commercial success, due to a variety of shortcomings. Several criteria can be identified which would be required by or important to a successful process. First, the process should scrub approximately 90% or more of the sulfur species from the raw gas, in order to meet environmental constraints and also to limit corrosion in downstream equipment. Secondly, the scrub pressure must slightly exceed the desired use pressure of the scrubbed reducing gas. Many major developing uses for reducing gas are at elevated pressure, e.g. 10 atmospheres or higher. The scrub temperature must exceed approximately 1100 K. to assure against carbon deposition. The reducing gases of interest have a temperature in the approximate 950 K. to 1100 K. range below which CO will spontaneously decompose to carbon. Carbon deposition on the sulfur sorbent complicates both scrub and regeneration and also reduces process efficiency. If the hot gas must be cooled sufficiently that CO decomposition is kinetically prevented, it is generally preferable to continue cooling it to where conventional aqueous scrubbing can be conducted.

The regeneration step must also be efficient, i.e. the total utility and energy cost for regeneration must be less than the amount of energy saved due to scrubbing while hot. Thus systems requiring large amounts of steam, air, or other regeneration media per mole of sulfur species scrubbed are generally not viable. Also the regeneration reaction should operate adiabatically with the scrub reaction, due to the difficulty and energy cost of changing the temperature of the sorbent material. The energy cost of regeneration must account for not only the cost of supplying the gaseous regeneration media, but also the cost of converting the sulfur species in the regenerator exhaust to a manageable form—either sulfur or sulfuric acid.

It is also desirable that the scrub and regeneration processes be continuous, in order to avoid the upsets and purge losses associated with batch operations. Sorbent transport is required in continuous systems, and this is greatly facilitated when the scrub and regeneration pressures are approximately equal. Finally the sorbent material must be durable—resistant to dusting, breakage, vapor phase migration, and deactivation due to chemical combination or melting.

Many of the hot gas desulfurization processes investigated to date are summarized in the Environmental Protection Agency report EPA-600/7-79-169, "Hot Gas Cleanup Process", by E. B. Onursal, July 1979, Research Triangle Park, N. C. No Prior art process achieves all of the above attributes. The Ni-S-O system has a melting composition at approximately 950 K., hence its useful temperature is too low, ZnO is limited to scrub temperature below 800° C., apparently due to vapor phase migration and also attrition. The Fe-S-O system has a melting point below 1200 K. It also has a serious problem regarding reducing gas consumption—the regenerated sorbent is either $Fe_2O_3$ or $Fe_3O_4$, whereas the spent sorbent is a mixture of FeS, Fe, and some FeO at the high temperatures of interest. Hence this sorbent involves a substantially greater transfer of oxygen into the reducing gas than other sorbents, amounting to a consumption of 1 to 3% of the gas heating value, and hence largely negating the advantages of hot gas cleanup. Copper has a problem of insufficient durability at high temperature, and also is reported to have an undesirably low scrub efficiency at high temperature. MnO has excellent high temperature scrub characteristics. However in the prior art process, MnS must be regenerated with a very dilute oxygen containing gas, making further recovery difficult, and making the volume requirement large. Also the major regeneration produce is $Mn_3O_4$, and it is reported that this must be completely reduced by a clean reducing gas to MnO before being restored to scrub service, as otherwise the sulfur content of the product gas would increase significantly until full reduction to MnO was achieved.

The documents referred to in the preparation of this disclosure include U.S. Pat. Nos. 4,164,544 and 3,079,223. The latter patent cites Cu as a sulfur sorbent material over a preferred temperature range of up to 700° C. The patent cites the harmful effect of having $Cu_2O$ in the regenerated sorbent, and discloses a regeneration method which both prevents the appearance of $Cu_2O$ in the regenerated sorbent and also allows regeneration at lower temperatures so as to keep the copper solids in better condition. The disclosed method or regenerating $Cu_2S$ is to react it with somewhat less than twice as much $Cu_2O$, whereby $Cu_2S$ is in stoichiometric excess. The $Cu_2O$, is provided by reacting some of the regenerated sorbent with additional $Cu_2O$, to eliminate essentially all $Cu_2S$ from that part, and then reacting the resulting mixture with air.

DISCLOSURE OF INVENTION

A continuous regenerative hot gas desulfurization process using MnO as sulfur sorbent is disclosed which achieves all of the attributes cited above; scrub and regeneration temperatures are above 1100 K.; carbon deposition is avoided; approximately 95% of the sulfur is scrubbed from typical high sulfur reducing gases; scrub and regeneration steps are adiabatic and operate at approximately the same pressure; a high pressure, high purity $SO_2$ gas is obtained from regeneration using only air as the regeneration medium; and the sorbent is protected from the detrimental effects of excessive temperature or sulfation.

This result is achieved by contacting the reducing gas with a sorbent having an active sulfur absorbing component consisting essentially of between 60 and 98% MnO and between 2% and 40% $Mn_3O_4$. The MnS containing spent sorbent is then contacted with oxidized sorbent, i.e. with a material having a higher $Mn_3O_4$ to MnO ratio than that of the above described sorbent material. Thus the chemically combined oxygen carried by the $Mn_3O_4$ provides the oxygen necessary to regenerate MnS and produce $SO_2$ gas, while at the same time the coexistence of MnO and $Mn_3O_4$ keeps the oxygen gas partial pressure extremely low, and hence makes possible high $SO_2$ partial pressures without sulfating the manganese oxide. Oxidized sorbent is provided in an amount between 2% and 30% greater than the stoichiometric amount necessary to react with the MnS content of the spent sorbent, whereby the regenerated sorbent contains the $Mn_3O_4$ content cited above, with only trace amounts of unreacted MnS. In order to provide the oxidized sorbent for the regeneration reaction, between 60% and 90% of the regenerated sorbent is cycled through an oxidation reaction, and the remaining 10% to 40% of the regenerated sorbent is recycled to the reducing gas scrubber. In the oxidation reaction, the regenerated sorbent is contacted with air to provide the necessary $Mn_3O_4$ and a pure nitrogen exhaust, and then the oxidized sorbent is recycled to the regeneration reaction. The amount of air supplied to the oxidation reaction is preferably restricted to less than the stoichiometric amount necessary for reaction of all MnO to $Mn_3O_4$, in order to prevent $Mn_2O_3$ from forming in more than minor amounts.

By providing a stoichiometric excess of $Mn_3O_4$ to the regeneration reaction, sufficient to ensure a minor $Mn_3O_4$ content in the regenerated sorbent, it has unexpectedly been found that there is only an inconsequential degradation in sulfur scrubbing capability, whereas undesirble $SO_2$ concentrations in the oxidizer exhaust are avoided without the need for a pre-oxidation soak to remove MnS.

BEST MODE FOR CARRYING OUT THE INVENTION

Figure 1:
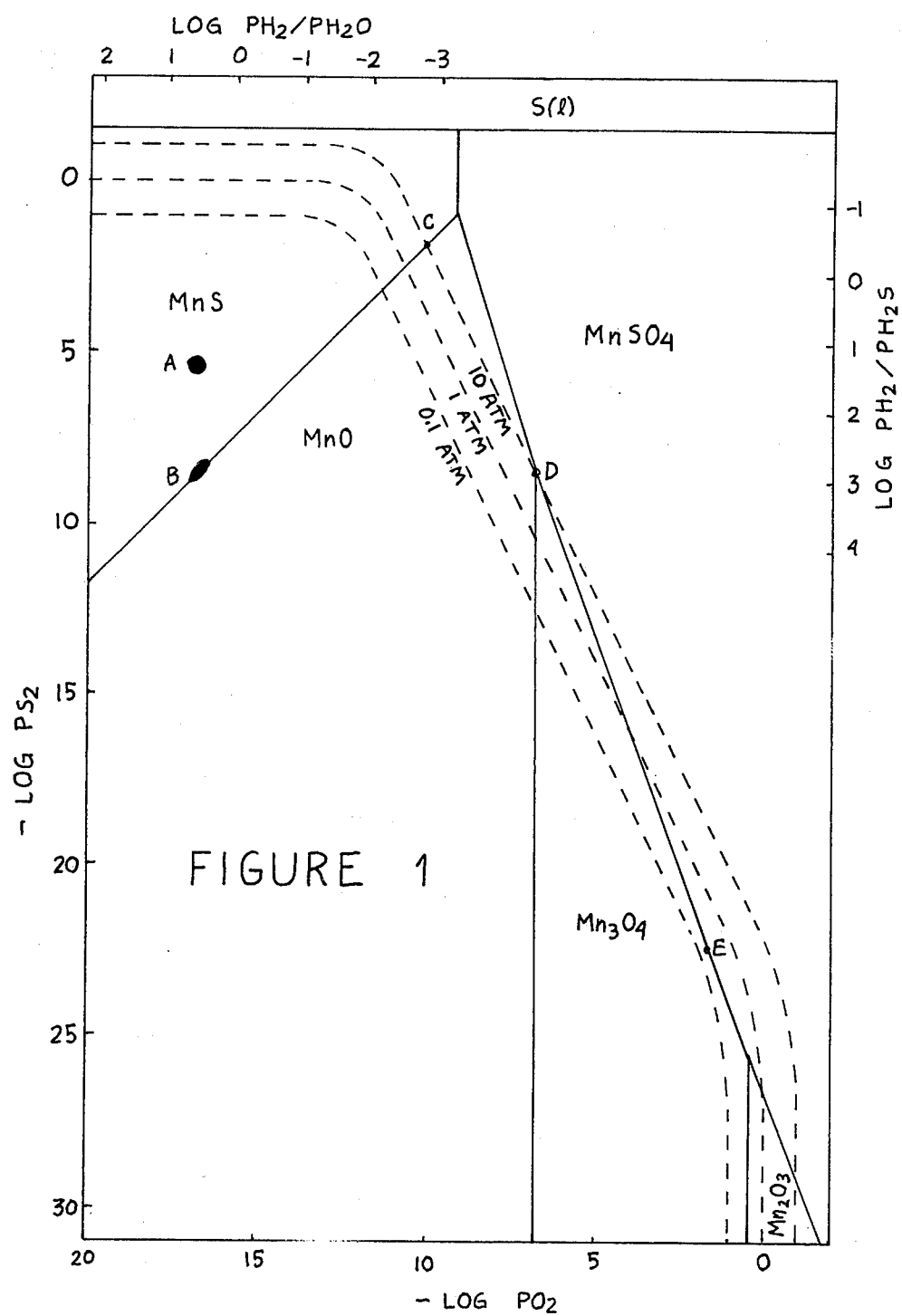
FIG. 1 is a phase stability diagram of the Mn-S-O system at 1200 K. It illustrates the excellent characteristics of MnO as a sulfur sorbent, and also illustrates the thermodynamic principles embodied in the disclosed invention, e.g. why maintenance of a low $pO_2$ in the regeneration zone allows markedly higher $pSO_2$. It was prepared from thermodynamic data in the National Standard Reference Data System and also in the journal article "Sulfate and Sulfide Reactions in the Mn-O-S System", E. T. Turkdogan et al, *Metallurgical Transactions B* Volume 88, Mar. 1977, pages 59 to 65. Similar diagrams at other temperatures can be found in the Electric Power Research Institute Report FP-539, "Thermodynamic Phase Stability Diagrams for the Analysis of Corrosion Reactions in Coal Gasification/Combustion Atmospheres", F. L. Hemmings and R. A. Perkins, Palo Alto, Calif., Dec. 1977.

FIG. 1 illustrates the thermodynamics of the major chemical reactions occurring during hot gas desulfurization by MnO. A typical reducing gas composition resulting from the partial oxidation of high sulfur (e.g. 4 w/o) coal or oil is given by point A: the ratio $pH_2/pH_2O$ is on the order of 1.5 to 5, and the $pH_2/pH_2S$ is in the range of 20 to 40. This composition is in the region of MnS stability at 1200 K.; hence the MnO will react with the reducing gas according to

$$MnO + H_2S = MnS + H_2O \qquad (1)$$

As $H_2S$ is removed from the reducing gas, its composition will approach an equilibrium value of point B. There is a slight increase in the reducing gas $pO_2$ as $pS_2$ decreases, but it is too small to be detected at the scale illustrated. From A to B, $pS_2$ decreases from $10^{-5.6}$ to $10^{-8.7}$ atm., i.e. by a factor of 1259. Hence $pH_2S$ decreases by a factor of $\sqrt{1259} = 35.5$ This equates to scrubbing 97.2% of the $H_2S$ out of the reducing gas, and approximately the same percentage of COS. It can be seen that if the reducing gas initially is a lower quality, i.e. has a lower $pH_2/pH_2O$ ratio, then the extent of sulfur removal possible is lower, due to the slope of the MnO-MnS phase boundary.

The sulfided sorbent, MnS, is then sent to regeneration. In prior art processes, a small amount of $O_2$ diluted by other gases such as $N_2$, $CO_2$, or $H_2O$ would be blown across the MnS. The effect of this is shown in FIG. 1 by the three dashed lines. Each dashed line represents the locus of possible gas phase compositions resulting when pure oxygen is injected at controlled pressures of 0.1, 1, and 10 atm. ($10^4$, $10^5$, and $10^6$ Pa). The vertical portion of each line is essentially pure $O_2$, the diagonal is essentially pure $SO_2$, and the horizontal is essentially pure gaseous $S_2$, whereas the knees or curved portions are mixtures of the respective gases. Initially MnS reacts with $O_2$ forming MnO and $SO_2$. However, as long as $pO_2$ exceeds $10^{-6.92}$ atm., the MnO will further react with oxygen to form $Mn_3O_4$. Once $Mn_3O_4$ is present in the regenerator in conjunction with high oxygen partial pressures, the sulfation problem becomes critical. When the $pSO_2$ is 1 atm., $MnSO_4$ will form from $Mn_3O_4$ at any $pO_2$ above $10^{-4}$ atm. Even for a $pSO_2$ as low as 0.14 atm., $MnSO_4$ will form from $Mn_3O_4$ at a $pO_2$ of 0.05 atm. or higher, as shown by point E, according to

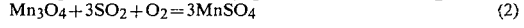
$$Mn_3O_4 + 3SO_2 + O_2 = 3MnSO_4 \qquad (2)$$

In the prior art process, the only way to avoid reaction (2) has been to keep $pSO_2$ very low, e.g. below 0.14 atm., since $pO_2$ is inherently high due to the practice of blowing oxygen gas directly into the regenerator. In contrast, the disclosed invention provides a new means of supplying oxygen to the regeneration reaction. It is supplied in chemically combined form, i.e. as $Mn_3O_4$. Hence the $pO_2$ in the regenerator never exceeds the value established by the $MnO$-$Mn_3O_4$ equilibrium ($10^{-6.92}$ atm. in FIG. 1). Therefore $pSO_2$ can achieve much higher values - up to 10 atmospheres in FIG. 1. By using the disclosed regeneration reaction

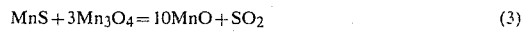
$$MnS + 3Mn_3O_4 = 10MnO + SO_2 \qquad (3)$$

and by controlling the regenerator pressure to no greater than 10 atmospheres at 1200 K. regeneration temperature, the locus of possible regeneration reaction conditions will fall along the line C-D, i.e. remain totally within the MnO region of stability, thereby precluding $MnSO_4$ formation.

The Mn$_3$O$_4$ which is supplied to the regeneration reacton is obtained by reaction part of the MnO with molecular oxygen, according to the reaction $$3MnO + \tfrac{1}{2}O_2 = Mn_3O_4 \qquad (4)$$

At high pO$_2$ values, greater than about 0.44 atm. at 1200 K., the Mn$_3$O$_4$ will oxidize further to Mn$_2$O$_3$. Mn$_2$O$_3$ should not be supplied to the regenerator in more than trace amounts - it is readily sulfated by low pSO$_2$, and its rapid decomposition tends to increase pO$_2$ to values where Mn$_3$O$_4$ will also sulfate. It is also believed that Mn$_2$O$_3$ formation undesirably increases the attrition of the sorbent via dusting. The formation of Mn$_2$O$_3$ in the oxidizer can be avoided by restricting the amount of oxygen charged to the oxidizer to less than the stoichiometric amount necessary to react all the MnO to Mn$_3$O$_4$, or by restricting pO$_2$ to below the Mn$_2$O$_3$ formation value. The oxidation reaction is strongly exothermic, and will therefor normally be at a higher temperature than the regeneration reaction, which is slightly endothermic. FIG. 1 shows that the pO$_2$ must equal or exceed 0.44 atm. for Mn$_2$O$_3$ to form at 1200 K. This increases to 1 atm. at 1250 K. Also, given cocurrent gas-solids flow, even higher inlet pO$_2$ values are acceptable, since the pO$_2$ reduces very rapidly as the reaction proceeds. Hence it is possible to oxidize using air rather than a more dilute mixture without causing undesirable higher oxides to form. Some degree of internal circulation of nitrogen in the oxidizer, in order to mix with and dilute the incoming air, is also contemplated and not excluded.

In its broadest aspects the disclosed process involves three reactions: the scrubbing reaction between the reducing gas and the MnO and Mn$_3$O$_4$ containing sorbent; the regeneration reaction between MnS containing spent sorbent and Mn$_3$O$_4$ containing oxidized sorbent; and the oxidation reaction between air and regenerated sorbent. The process encompasses any known means for conducting these reactions, e.g. fixed beds, fluidized beds, gravitating beds, and the like. It also encompasses any known means of transporting solids and controlling their flow rate between the respective reactions, e.g. gravity feed, screw conveyor, gas-fluidized transport, lock hoppers, and the like.

Figure 2:
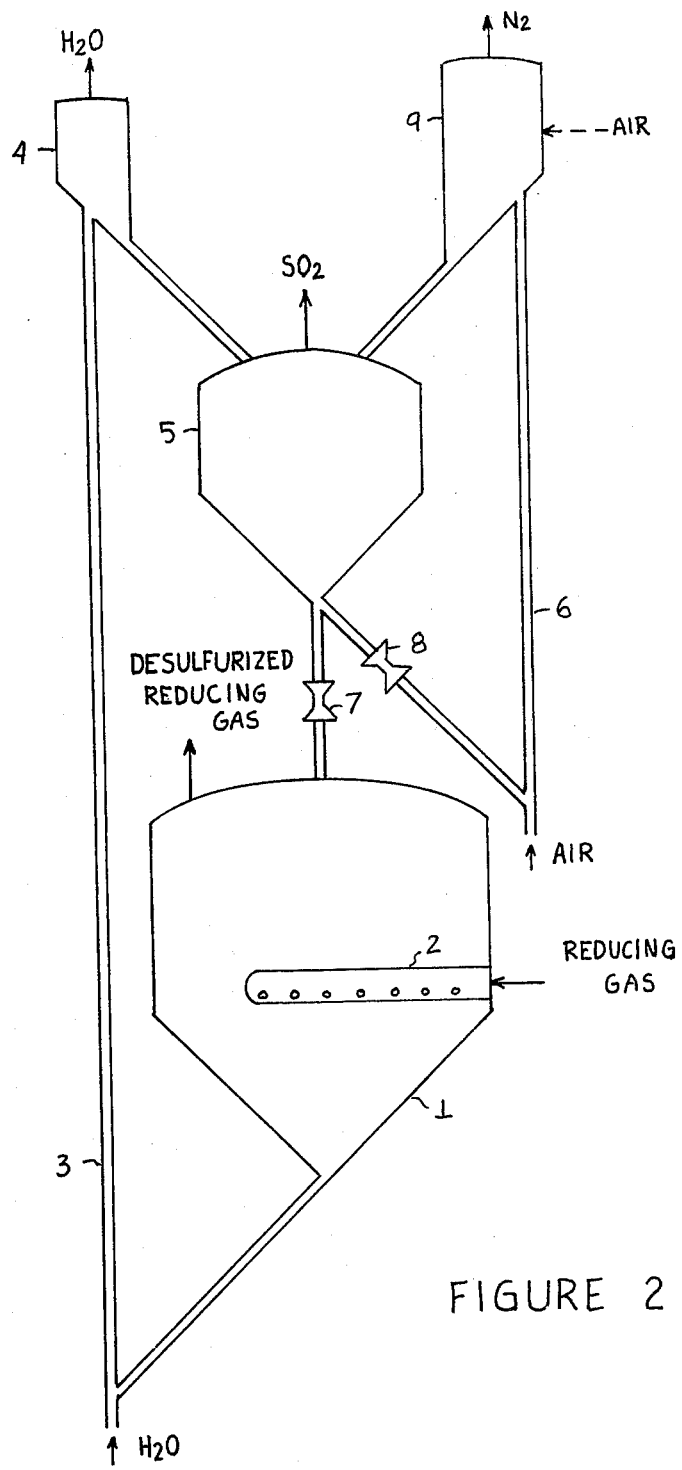
FIG. 2 is a schematic flow diagram illustrating an arrangement of apparatus suitable for conducting the preferred embodiment of the disclosed process.

A particularly preferred apparatus for carrying out the disclosed process is illustrated in FIG. 2. In the scrubber 1 the hot reducing gas is introduced through manifold 2 and is desulfurized by contact with sorbent. Spent sorbent is conveyed through lift pipe 3 by fluidized transport using a gas such as nitrogen or steam. In disentrainment chamber 4 the spent sorbent disengages from the conveying gas and feeds by gravity into regenerator 5. There it is contacted with a proportioned amount of oxidized sorbent, with the result that regeneration proceeds and SO$_2$ is generated while the oxygen partial pressure remains below 10$^{-6}$ atmospheres. The flow of regenerated sorbent is proportioned between the scrubber 1 and the oxidation lift pipe 6 by the action of pinch valves 7 and 8. Regenerated sorbent directed to the oxidation lift pipe 6 is conveyed to oxidation chamber 9 by fluidized transport using a gas such as air, nitrogen, or steam. If required, in order to achieve the desired amount of Mn$_3$O$_4$ formation, additional air is injected directly into oxidation chamber 9. Oxidized sorbent flows by gravity from oxidation chamber 9 back to regenerator 5.

The use of mechanical stirrers or static mixers, e.g. in the regenerator, is not precluded, but not necessary at the higher temperatures. Likewise, the provision of an inert gas seal between the scrubber and regenerator is not precluded, but with careful pressure control will not be necessary. The pressures in the respective vessels can be controlled by throttling the gas stream exhausting from each vessel, in order to maintain a pressure balanced system and minimize gas flow between vessels. Solids makeup and extraction are conveniently conducted at oxidation chamber 9.

System pressure can be in the approximate range of 1 to 30 atmospheres. Temperatures can range from 1100 K. to 1400 K. The preferred temperature ranges are 1100 K. to 1250 K. in the scrubber, 1150 K. to 1275 K. in the regenerator, and 1200 K. to 1350 K. in the oxidizer. The maximum SO$_2$ partial pressure possible in the regenerator at 1200 K. without causing sulfation is shown in FIG. 1 to be 10 atmospheres. This limit increases with increasing temperature. If it is desired to operate at a system pressure greater than the maximum possible SO$_2$ pressure, then the regenerator pressure can be increased by adding diluent gas such as steam or nitrogen. One method of conveniently doing this is to return gases as well as solids from either oxidizer 9 or disentrainer 4 or both to the regenerator.

By way of numerical example a reducing gas containing 0.6% H$_2$S plus COS (6000 ppm) is introduced into the scrubber at a rate such that H$_2$S plus COS enter at a rate of 10.6 kilogram-moles per second (i.e., "units"). The exit concentration is reduced to 0.6 units, or approximately 340 ppm. Regenerated sorbent is introduced into the scrubber at a rate such that active MnO and Mn$_3$O$_4$ are supplied at rates of 13 units and 1 unit respectively, i.e. 7% Mn$_3$O$_4$. This does not preclude there being additional inactive MnO in the sorbent, i.e. MnO which does not participate in the scrub reaction. The spent sorbent is discharged to the regenerator at rates providing 10 units of MnS and 6 units of MnO. In the regenerator it is combined with oxidized sorbent flowing from the oxidizer providing 27 units of Mn$_3$O$_4$ and 15 units of MnO. The flow of regenerated sorbent out of the regenerator contains 91 units of MnO and 7 units of Mn$_3$O$_4$. One seventh of this stream, or 14.3%, is recycled to the scrubber, while the remainder is recycled to the oxidizer via the oxidation lift pipe, where it reacts with air (or other molecular oxygen containing gas) supplied at a rate so as to provide approximately 10.5 units of oxygen, but no more than 14 units so as to preclude Mn$_2$O$_3$ formation.

Since excess oxygen is provided to the regenerator (in the form of Mn$_3$O$_4$), the regenerated sorbent has a definite Mn$_3$O$_4$ content and hence an extremely low MnS content. This prevents the appearance of more than trace quantities of SO$_2$ in the oxidizer exhaust. Surprisingly, however, a pre-reduction step is not required before returning the Mn$_3$O$_4$ containing regenerated sorbent to the scrubber. In the continuous system, the slight amount of additional oxygen this introduces into the scrubber is not sufficient to cause more than a 3% reduction in the scrub efficiency, and hence it is still well above 90%.

The oxidation reaction is strongly exothermic. Oxidation temperature can be regulated by controlling the temperature of the supply air, or by providing alternative cooling means. The regeneration reaction is mildly endothermic, hence there is no need for concern over excessive regeneration temperatures as in prior art processes. The excess sensible heat of the oxidized sorbent can conveniently supply the heat requirements of the regeneration reaction. Thus adiabatic operation is conveniently achieved.

The sorbent material containing manganese oxide is preferably in pellet form and associated with an inert support material in order to resist attrition or entrainment in the various gas streams. The support material can be any one or mixture of the oxides normally applied in similar high temperature service: alumina, silica, zirconia, thoria, etc. The support can be surface impregnated with the active manganese oxide, for example by soaking it in aqueous mangasese nitrate solution and then calcining it. Alternatively it can be mixed intimately with the active material and then sintered, as disclosed in U.S. Pat. No. 4,164,544. This does not exclude the use of other forms or compositions, including the pure manganese ore.

All percents signify molar percent.

I claim:

1. A continuous regenerative process for desulfurizing a hot reducing gas comprising:
   a. contacting the reducing gas with sorbent wherein the active sulfur absorbing component of the sorbent consists essentially of between 60% and 98% MnO and between 2% and 40% $Mn_3O_4$, whereby $H_2S$ reacts with the sorbent to form MnS containing spent sorbent;
   b. contacting the MnS containing spent sorbent with oxidized sorbent containing $Mn_3O_4$, wherein $Mn_3O_4$ is supplied in an amount between 2% and 30% greater than the stoichiometric amount necessary for reaction with the MnS content of the spent sorbent, whereby $SO_2$ is generated and the said sorbent is regenerated;
   c. withdrawing the $SO_2$ at a controlled pressure between 1 and 30 atmospheres:
   d. recycling between 10% and 40% of the regenerated sorbent to additional reducing gas contact;
   e. contacting the remainder of the regenerated sorbent with a molecular oxygen containing gas, whereby the oxidized sorbent is obtained;
   f. recycling the oxidized sorbent to additional contact with the spent sorbent.

2. The process according to claim 1 wherein the gaseous partial pressure of oxygen is maintained below $10^{-6}$ atmospheres in the step of contacting spent sorbent and oxidized sorbent.

3. The process according to claim 1 wherein the molecular oxygen containing gas is air and the amount of air supplied to contact regenerated sorbent is regulated to no more than the stoichiometric amount necessary to convert all of the active MnO to $Mn_3O_4$, whereby the formation of $Mn_2O_3$ is avoided.

4. The process according to claims 1, 2, and 3 wherein all contacting actions are conducted in the temperature range 1100 K. to 1400 K. and pressure range 1 to 30 atmospheres, and are conducted at approximately the same pressures.

5. The process according to claim 3 wherein at least part of the gaseous exhaust from the contact between air and regenerated sorbent is discharged to the zone of contact between spent sorbent and oxidized sorbent.

6. The process according to claim 1 wherein substantially all of the oxygen necessary to generate $SO_2$ is provided by $Mn_3O_4$.

* * * * *